United States Patent [19]

Cole et al.

[11] Patent Number: 5,342,123
[45] Date of Patent: Aug. 30, 1994

[54] DETENTED FRAME DOOR ASSEMBLY

[75] Inventors: Phill D. Cole, Richmond, Ky.; David E. Southworth, Wake Forest, N.C.

[73] Assignee: International Business Machines Corp., Armonk, N.Y.

[21] Appl. No.: 924,289

[22] Filed: Aug. 3, 1992

[51] Int. Cl.⁵ .......................... A47B 88/18; E05C 3/02
[52] U.S. Cl. ................................... 312/319.2; 49/383; 49/394; 292/229; 312/327
[58] Field of Search .................. 312/319.2, 319.1, 326, 312/327; 49/383, 394; 292/209, 229

[56] References Cited

U.S. PATENT DOCUMENTS 1,646,266 10/1927 Stoner ............................ 312/319.2 X
4,630,794 12/1986 Ross ................................ 312/319.2 X Primary Examiner—Joseph M. Gorski
Attorney, Agent, or Firm—Laurence R. Letson

[57] ABSTRACT

A door forming a part of a closure assembly is attached to the frame of the closure assembly by engaging bifurcated branches of a pivot arm with a pivot shaft. One of the branches is extended to engage a curved leaf spring which is deformed as the door and the extension is pivoted about the shaft. The deformation of the spring is instrumental in exerting a force on the extension to detent the door in the closed position and the extension may disengage from the spring surface when in the open position. To further stabilize the door, a stabilizer is formed on the back of the door and it engages the end of a recessed channel in the assembly, at a point coincident with the pivot axis of the door.

5 Claims, 3 Drawing Sheets

DETENTED FRAME DOOR ASSEMBLY

FIELD OF THE INVENTION

This invention relates to the detenting of closures and more particularly to the detenting and holding of a frame mounted door in bi-stable positions.

BACKGROUND OF THE INVENTION

In the design of electronic components for use in desktop computer systems, the openings to the disk drives must be accessible to the operator. It is desirable to shield those openings from view for aesthetic reasons while at the same time providing a movable device, such as a door, whereby access to the devices may be re-established at any time the operator desires.

By placing a door over the openings to the disk drives or other devices within the frame of the electronic device, the devices are shielded from view but readily accessible.

It is necessary to hold the door in a fully closed position in order to maintain a pleasant appearance as well as to permit the door to open fully to provide free access to the components behind the door.

Therefore, it is an object of the invention to detent the door in a fully closed position and to then permit the door of the closure assembly to open to the fully open position and to remain in either of the positions without being held by the operator.

It is another object of the invention to detent the door in at least the closed position.

SUMMARY OF THE INVENTION

A bifurcated pivot arm is formed on the backside of a pivotable door and extended therefrom and the bifurcations are slipped over a pivot shaft engaging pivot surfaces on the bifurcated pivot arms with the pivot shaft. One of the bifurcated branches of the pivot arm is provided with a further extension which engages a detent spring, which is formed of a flat leaf spring. The flat leaf spring is formed into two portions, a retaining portion for being held or retained by the housing and a curved extension. The extension of the bifurcated branch of the pivot arm engages the exterior curved surface of the curved extension of the spring and, when moved relative to the pivot shaft, the extension will deflect the curved extension of the leaf spring thereby providing a biasing force to the extension. After the extension passes the over-center point, the leaf spring will cause the arm to be further displaced and thus to force the pivoting of the door further in the direction in which it is being moved. When the door is pivoted from a vertical to a horizontal position and the mass of the door is lowered, gravity may be used to effect the bi-stable second position, and the extension of the bifurcated branch of the pivot arm may disengage from the surface of the leaf spring.

A more detailed understanding of the invention may be had from the drawings and the detailed description of the invention to follow.

DRAWINGS

DETAILED DESCRIPTION OF THE BEST MODE FOR CARRYING OUT THE INVENTION

Figure 1:
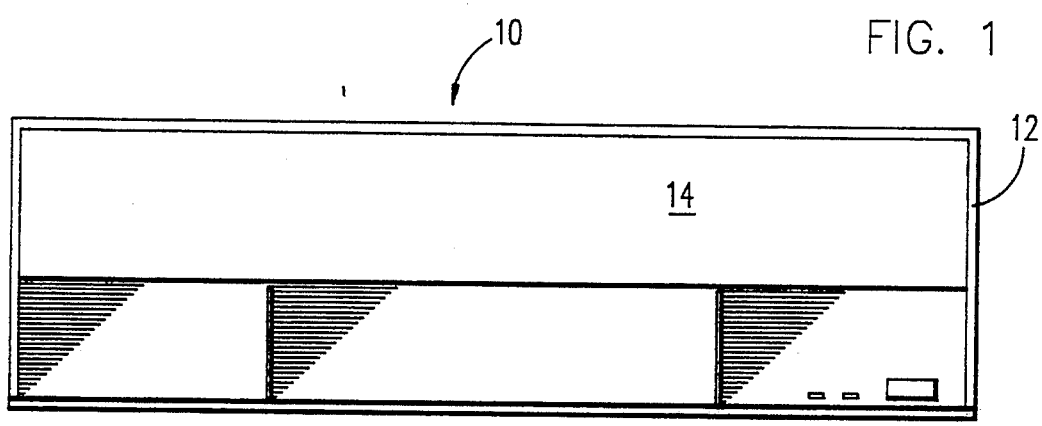
FIG. 1 is a front view of a bezel assembly with a door in a closed position concealing the devices resident behind the door.

Referring now to FIG. 1, the bezel assembly 10 is shown with a frame 12 and a door 14 or closure 14. The door 14 is illustrated in a closed position concealing the openings 22, 24 to components of the electronic device 11 upon which the frame 12 is mounted.

Figure 2:
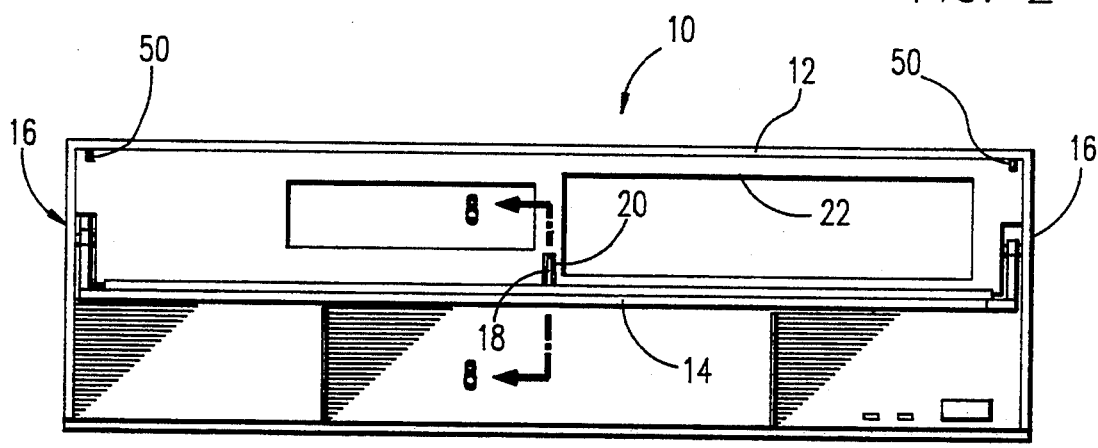
FIG. 2 is a front view of the same bezel assembly with the door opened thereby exposing the apertures in the bezel assembly which may be placed around the devices of the electronic device.

Referring to FIG. 2, frame 12 is illustrated with the door 14 pivoted to its open or down position. Door 14 is constrained and pivoted using pivot assemblies 16. In order to stabilize the door 14 over its substantial length, a stabilizer means 18 is shown engaged with a recess 20 formed into the face of bezel 16, to be described later. Apertures 22 and 24 are formed into the frame 12 to fit over components in the electronic device 11 to which the bezel assembly 10 is attached. Apertures 22 and 24 typically permit access to disk drives.

Figure 3:
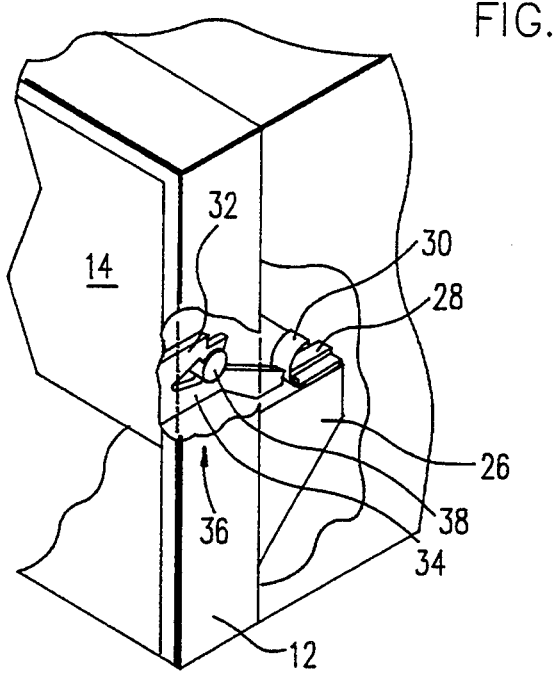
FIG. 3 is an elevated perspective view partially broken away, showing the door in a closed position detented by the detenting means, and the bezel assembly mounted on the housing of the electronic device.

Referring now to FIG. 3, frame 12 is provided with a support member 26 on the backside of the frame 12. Support member 26 in cooperation with retaining lug 28 acts to hold and retain detenting leaf spring 30. Illustrated, protruding from the rear surface of door 14, are bifurcated branches 32 and 34 which form pivot arm 36. The details of pivot arm 36 will be discussed below.

Pivot arm 36 is engaged with pivot shaft 38 and formed as an integral part of frame 12. Pivot shaft 38 provides an axis and a surface around which bifurcated branches 32 and 34 of pivot arm 36 may effectively pivot door 14 about the axis of pivot shaft 38.

Figure 4:
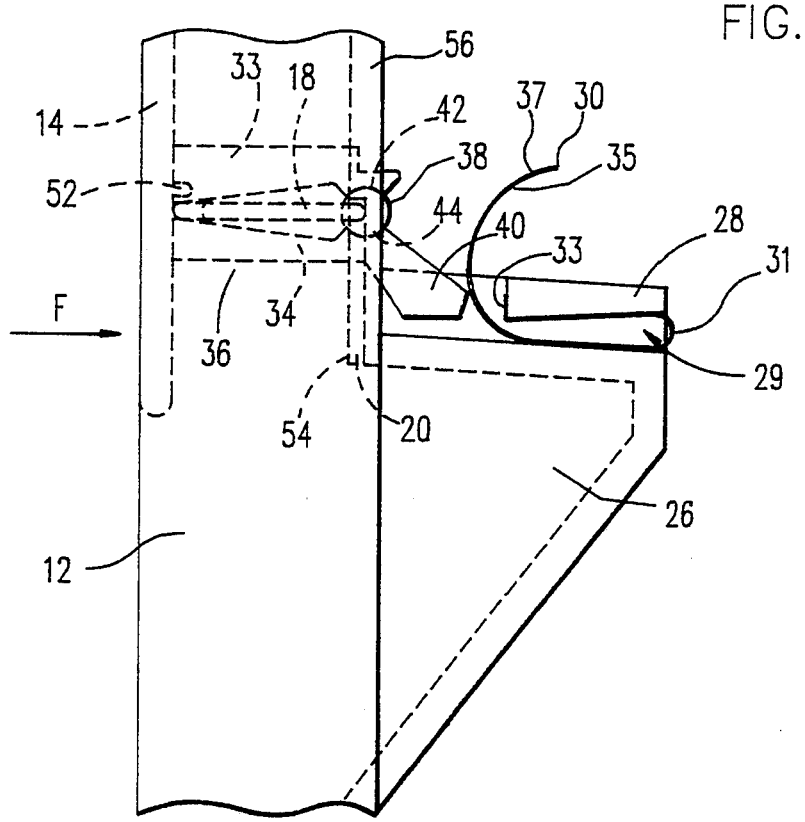
FIG. 4 is a side view of the details of the bifurcated pivot arm and detenting means.
Figure 5:
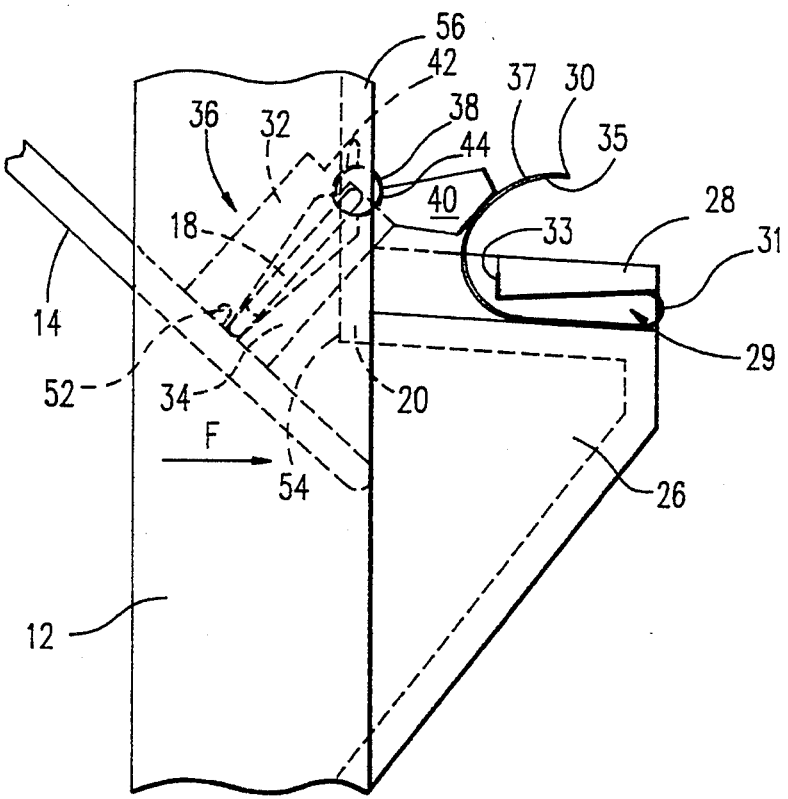
FIG. 5 illustrates the device of FIG. 4 with the door partially open.
Figure 6:
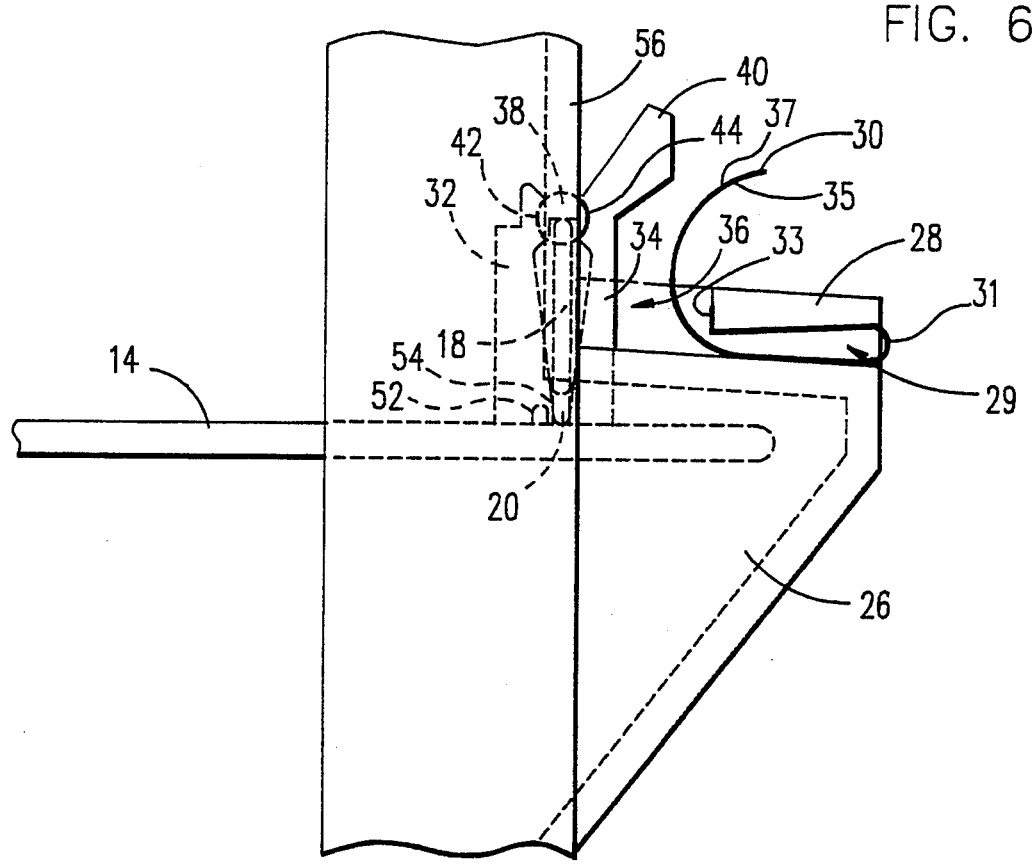
FIG. 6 illustrates the device of FIG. 4 with the door fully open.

Referring to FIGS. 4, 5 and 6, the door 14, pivot arm 36 and extension 40 and their engagement with other parts are illustrated in a variety of positions.

Door 14 is provided with a bifurcated pivot arm 36, which may be integrally molded with the door 14.

Branches 32 and 34 form the bifurcated pivot arm 36 and extend from the backside of door 14. There are partial cylindrical surfaces 42 and 44 formed in the distal ends of the branches 32 and 34, respectively. From the distal end of branch 34 an extension 40 extends outwardly and downwardly as shown in FIG. 4 for engagement with the detenting means 30 to be described later.

Frame 12 also provides at least a pair of pivot shafts 38, one for each pivot assembly 16 shown in FIG. 2. It should be noted that this pivoting assembly 16 is not limited to use only at the ends of the door 14, but may also be implemented at intermediate points along the door 14 if desired. Pivot shafts 38 are formed to have a substantially cylindrical exterior surface which is in turn engaged by surfaces 42 and 44 of the bifurcated branches 32 and 34 of pivot arm 36. Pivot shaft 38 defines the axis of pivoting door 14 by virtue of the engagement of surfaces 42 and 44 with shafts 38.

Frame 12 also is provided with an extension or support means 26 extending from the rear portion of the frame 12. Support means 26 is molded or formed to have an overhanging lug 28 above the top of and supported by support means 26 thereby leaving a small channel 29 between lug 28 and the top surface of support means 26. Into the channel 29, a portion of leaf spring 30 may be inserted. To insure retention of the leaf spring 30 between lug 28 and support member 26, the leaf spring 30 is doubled to form a U-shaped section 31 which is inserted into slot 29. The terminal end of the U-shaped portion 31 may be bent into a retaining flange 33 to prevent the leaf spring 30 from translating rightward when forcibly engaged by extension 40 as shown in FIG. 4.

Leaf spring 30 is further provided with a curved extended portion 35 which has an exterior curved surface 37. When door 14 is assembled to frame 12, the bifurcated arms 32 and 34 are spread and forced over pivot shaft 38 due to the natural flexibility of the material, typically a plastic, from which door 14 and pivot arm 36 are fabricated.

The extension 40 then will be forced to engage the curved extension 35 of leaf spring 30 which causes curved extension 35 to deflect. This deflection of leaf spring 30 then will continue to exert a clockwise force around pivot shaft 38 on the distal end of extension 40. The effect of this spring 30 biasing will be to rotate door 14 in a clockwise direction about shaft 38 until such time as the upper corners of door 14 engage stops 50 as shown in FIG. 2.

As the door 14 is opened by a force being exerted along arrow F in FIG. 4, door 14 will tend to pivot about shaft 38 in a counterclockwise direction. Leaf spring 30 will resist the movement of extension 40 and accordingly will resist the movement of door 14. If force F is of sufficient magnitude to cause the rotation of extension 40 past the over-center point on the external curved surface 37 of leaf spring 30, then the door 14 will pivot open and leaf spring 30 will act against extension 40 in a counterclockwise direction to further assist further opening of door 14. Door 14 then will continue to rotate about shaft 38 until such time as it reaches a horizontal position or such other position as is defined by the geometry of the door 14 and the frame 12. If a position other than horizontal is desired, rotation limit stops may be added to frame 12 to define the end of travel position.

In the preferred embodiment disclosed herein, stiffening rib 52 on the back surface of the door 14 will engage the lower edge 54 of the back wall 56 of frame 12. As stiffening rib 52 may be placed wherever desired, the ultimate orientation of the door 14 may be other than precisely horizontal. In this embodiment, the edge 54 of back wall 56 acts as a travel limit stop.

FIG. 5 illustrates the same elements as FIG. 4 only with the door in a partially open position.

Referring to FIG. 6, which is the same device and elements of FIG. 4 with the door in a fully open position, it will be seen that the extension 40 may disengage from the exterior curved surface 37 of leaf spring 30 and gravity affects the door 14 in its fully open position to create the stability in the second of the bi-stable positions.

Figure 7:
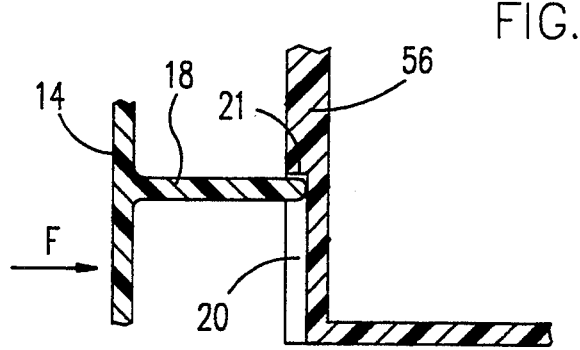
FIG. 7 and FIG. 8 illustrate a stabilizer on the door engaged with the frame in a closed and open position respectively.

In order to insure the proper opening and closure of the door 14, due to the fact that plastic is highly flexible and can be deformed easily when a force is exerted, a stabilizer 18 is illustrated in FIG. 7. Stabilizer 18 is formed as a single protruding extension or slender member 18 from the rear surface of door 14. The length of extension or stabilizer 18 is approximately the same length as the pivot arm 36 from the back of door 14 to the axis of pivot.

Recess 20 is formed as a groove or channel which terminates at recess end 21. Recess end 21 likewise is positioned substantially at the axis of pivoting as defined by the axis of the two or more pivot shafts 38. Stabilizer 18 engages the recess 20 and recess end 21; and when a force F is applied in FIG. 7, the end of extension 16 is forcibly pushed against recess 20 and recess termination 21. As the door 14 pivots to open, the continued exertion of force F against the face of door 14 will insure the continued engagement of stabilizer 18 with recess 20. This will keep the center-most section of door 14 generally aligned with the end portions of door 14 to prevent undue flexure of door 14. Further, it will tend to insure that any flexure of door 14 is limited so that the pivot arms 36 will not disengage from pivot shaft 38.

Figure 8:
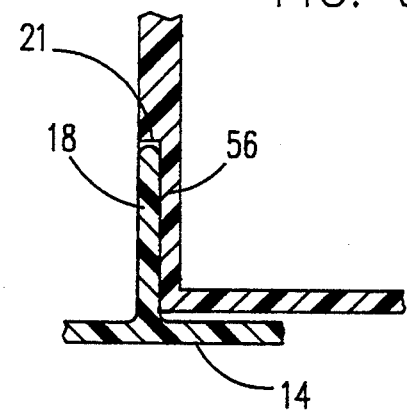

FIG. 8 illustrates the extension 16 fully contained within recess 20. One will appreciate that as the door is closed, the extension or stabilizer 16 engaged with recess 20 will provide a pivot point about which the center section of door 14 will pivot as door 14 is moved to a closed position.

Should the need arise to remove door 14 from frame 12, for purposes of gaining greater access to the devices behind door 14, it is only necessary to grasp the lower edge of door 14 and to pull forward, thereby disengaging pivot arm 36 from pivot shaft 38. Likewise, the extension 40 of bifurcated branch 34 will be disengaged from leaf spring 30. The door 14 cannot be easily removed when the door 14 is in its open position.

The preferred embodiment of the best mode of the invention having been disclosed above, it should be recognized that minor modifications and changes may be made to the device without departing from the scope of the invention as defined by the claims hereto.

This invention may be used in any environment where it is desirable to close openings in a housing and thus is not limited to use on electronic devices.

We claim:

1. A detented bi-stable closure assembly and container comprising:

a container having at least four sides and one open side;

a bezel assembly attached to said container to surround said one open side;

said bezel assembly comprising:

a closure covering said one open side;

at least an opening granting access to said open side of said container;

a frame engaged with said container;

said closure supported by said frame and pivotable between an open and a closed position, thereby opening and closing said opening, said frame defining at least said opening granting access to said open side of said container;

at least a pair of pivot shafts coaxially disposed on said frame and forming an axis of pivot for said closure;

detent means for detenting said closure comprising a leaf spring formed into a mounting portion and a curved portion having at least an external curved surface;

support means for supporting said detent means;

a pair of bifurcated arms extending from said closure;

each bifurcated arm having two branches defining a pivot surface therebetween, each said surface matingly engaged with one of said pivot shafts and moveable with respect thereto;

an extension formed onto one of said branches of each of said bifurcated arms and engaging said external curved surface when said closure occupies a closed position relative to said opening, thereby maintaining said closure in a closed position.

2. The detented bi-stable closure assembly and container of claim 1, wherein said extension is disengaged from said detent means when said closure occupies an open position relative to said opening.

3. The detented bi-stable closure assembly and container of claim 1 wherein said extension is formed as a part of said bifurcated branch disposed intermediate said detenting means and said pivot shaft when said closure occupies an open position relative to said opening.

4. The detented bi-stable closure assembly and container of claim 1 wherein said extension is formed as a part of one of said bifurcated branches to exert a force on said branch in a direction to further engage said said branch with said pivot shaft during at least a portion of the pivoting movement of said closure.

5. The detented bi-stable closure assembly and container of claim 1 further comprising a recess formed into said bezel assembly with an open end and a closed end, said closed end lying between said pivot shafts, and a stabilizing means extending form said closure and of such a length as to terminate proximate said pivot axis of said closure and within said recess, whereby said stabilizing means engages said recess and pivoting of said closure from a closed to an open position engages said stabilizing means with said closed end of said recess.

* * * * *